(12) United States Patent
Dunne et al.

(10) Patent No.: US 6,313,975 B1
(45) Date of Patent: *Nov. 6, 2001

(54) SELF-SOURCING, ISOLATED ZONE SELECTIVE INTERLOCKING SYSTEM FOR USE WITH ELECTRONIC TRIP CIRCUIT BREAKERS

(75) Inventors: David J. Dunne; Andy A. Haun, both of Cedar Rapids, IA (US)

(73) Assignee: Square D Company, Palatine, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,037

(22) Filed: May 8, 1998

(51) Int. Cl.[7] ....................................... H02H 3/00
(52) U.S. Cl. ................................................ 361/64
(58) Field of Search ........................................ 361/62–69

(56) References Cited

U.S. PATENT DOCUMENTS

| 4,271,444 | * | 6/1981 | Howell .................................... 361/48 |
| 4,706,155 | * | 11/1987 | Durivage et al. ...................... 361/64 |

* cited by examiner

*Primary Examiner*—Ronald W. Leja
(74) *Attorney, Agent, or Firm*—Kareem M. Irfan; Larry I. Golden

(57) ABSTRACT

A zone selective interlocking system for electronic trip circuit breakers includes a plurality of downstream terminals, each downstream terminal connecting with at least one of a plurality of downstream electronic trip circuit breakers having input terminals. A restraint input circuit module, including a voltage comparator, is connected to the input terminals of each of the downstream electronic trip circuit breakers and the input terminals are shorted together providing a self-restraint signal for each downstream electronic trip circuit breaker at the occurrence of a downstream fault condition. The system also includes a plurality of upstream terminals, each upstream terminal connecting with at least one of a plurality of upstream electronic trip circuit breakers having input terminals. The restraint input circuit module is connected to the input terminals of each of the upstream electronic trip circuit breakers for receiving a signal indicative of the downstream fault condition and wherein the restraint input circuit module is self-sourcing. An output circuit module including an opto-isolator is connected to each of the upstream electronic trip circuit breakers and each of the downstream electronic trip circuit breakers for providing galvanic isolation between circuit breakers in a restrained mode and circuit breakers in an unrestrained mode.

9 Claims, 5 Drawing Sheets

SELF-SOURCING, ISOLATED ZONE SELECTIVE INTERLOCKING SYSTEM FOR USE WITH ELECTRONIC TRIP CIRCUIT BREAKERS

BACKGROUND OF THE INVENTION

1. Field of the Invention

This invention relates to the use of electronic trip circuit breakers, particularly the use of a zone selective interlock system with electronic trip circuit breakers.

2. Description of the Related Art

The primary concern in determining the appropriate circuit protective devices for use in an electrical power distribution system is protection of the distribution system in the event of a fault precipitating abnormal overcurrent condition. The concern is to prevent or at least minimize damage to the system, including its conductors and connected loads. Equipment failure, human error, or emergencies of natural origin may cause such a fault. Typically, such faults are unpredictable, and thus the selected circuit protective devices must function automatically to fully protect the system, and incidentally to protect personnel and property against the consequential hazards of such faults.

Another principle concern with the circuit protection devices to be used is minimizing the extent and duration of electrical service interruption in the event of a fault. Typically, two or more circuit protection devices are placed between a fault and the source of the fault current. In order to minimize electrical service interruption, the protective devices are selective in response such that the one nearest the fault will first attempt to interrupt the fault current. If this protective device does not clear the fault in a timely fashion, the next upstream protective device will attempt to do so, and so on. This response selectivity is termed system selective coordination.

In a circuit breaker having an electronic trip unit, the electronic trip unit has two modes of operation, restrained and unrestrained. In the unrestrained mode, the electronic trip unit initiates a trip of the circuit breaker instantaneously regardless of selected delay settings. In the restrained mode, the electronic trip unit initiates a trip of the circuit breaker after the selected delay has timed out. Incorporating a zone selective interlock system allows the circuit breakers to communicate with each other ensuring that the breaker closest to the fault clears the fault.

Zone selective interlocking functions in an electrical system typically provide for a lower level "downstream" zone to send a restraint signal up to higher level "upstream" zone circuit breakers, wherein the upstream circuit breakers would be restrained from tripping, allowing the downstream circuit breaker to trip to minimize interruption of the electrical system. However, a lot of power is required for the downstream circuit breaker to send the restraint signal up through one or more levels of upstream circuit breakers.

FIG. 1 (labeled prior art) illustrates a typical zone selective interlocking system 100 for electronic trip circuit breakers, including a main (or upstream) circuit breaker A and branch (or downstream) circuit breakers B and C, respectively. The arrows indicate the direction of current flow. The system illustrated in FIG. 1 has separate short time (ST) and ground fault (GF) restraint circuits, however, only the ST connections are illustrated in FIG. 1. Each circuit breaker includes an output terminal (ST OUT), a common output terminal (ST OUT COMMON), an input terminal (ST IN), and a common input terminal (ST IN COMMON). The output circuit must be connected to the input circuit for each circuit breaker in order to provide a self-restraint signal to the circuit breaker. For example, in circuit breaker B, ST OUT is connected to ST IN and ST OUT COMMON is connected to ST IN COMMON to provide a self-restraint signal to the circuit breaker B. Therefore, if a fault occurs downstream from circuit breaker B, circuit breaker B would drive a restraint signal up to circuit breaker A while also driving its own restraint input circuitry and also the restraint input circuitry of circuit breaker C. Therefore, in the system design of FIG. 1, each circuit breaker must restrain its own input as well as the input circuits of all of the circuit breakers at the same level or zone and the input circuits of all the circuit breakers it must restrain at the other levels or zones.

In large multiple level systems, a single output circuit may not have sufficient drive capability to drive a restraint signal to all of the circuit breakers as described. An interface module is typically added to the system to boost drive capability, which adds cost and complexity to the system. The system as illustrated in FIG. 1 also does not include an isolation means and the common inputs are all tied to system ground. Therefore, a ground fault occurring in the system may cause ground currents to flow throughout the zone selective interlocking system possibly damaging circuitry.

Another problem with existing zone selective interlocking systems is ensuring that the system is properly wired. The circuit breakers in the system are typically located great distances apart. The only method for checking existing systems is to monitor the system signals with an oscilloscope while a fault signal is secondarily injected using a test kit or primarily injected using a current supply capable of several thousand amperes. This method causes a number of difficulties such as requiring personnel at multiple locations, a fault must be simulated to cause the restraint circuits to operate, and power may not be available or equipment mobile enough to check different levels of the system.

Accordingly, a zone selective interlocking system for electronic trip circuit breakers is needed which does not use large drive capabilities, which has sufficient isolation between restrained and unrestrained circuit breakers to prevent damage to the circuitry, and which can be easily tested.

SUMMARY OF THE INVENTION

A zone selective interlocking system for electronic trip circuit breakers is disclosed including a plurality of downstream terminals, each downstream terminal connecting with at least one of a plurality of downstream electronic trip circuit breakers having input terminals. A restraint input circuit module is connected to the input terminals of each of the downstream electronic trip circuit breakers and the input terminals are shorted together providing a self-restraint signal for each downstream electronic trip circuit breaker at the occurrence of a downstream fault condition. The system also includes a plurality of upstream terminals, each upstream terminal connecting with at least one of a plurality of upstream electronic trip circuit breakers having input terminals. The restraint input circuit module is connected to the input terminals of each of the upstream electronic trip circuit breakers for receiving a signal indicative of the downstream fault condition and wherein the restraint input circuit module is self-sourcing. The restraint input circuit module includes, for example, a voltage comparator. An output circuit module including an opto-isolator is connected to each of the upstream electronic trip circuit breakers and each of the downstream electronic trip circuit breakers for providing galvanic isolation between circuit breakers in a restrained mode and circuit breakers in an unrestrained mode.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
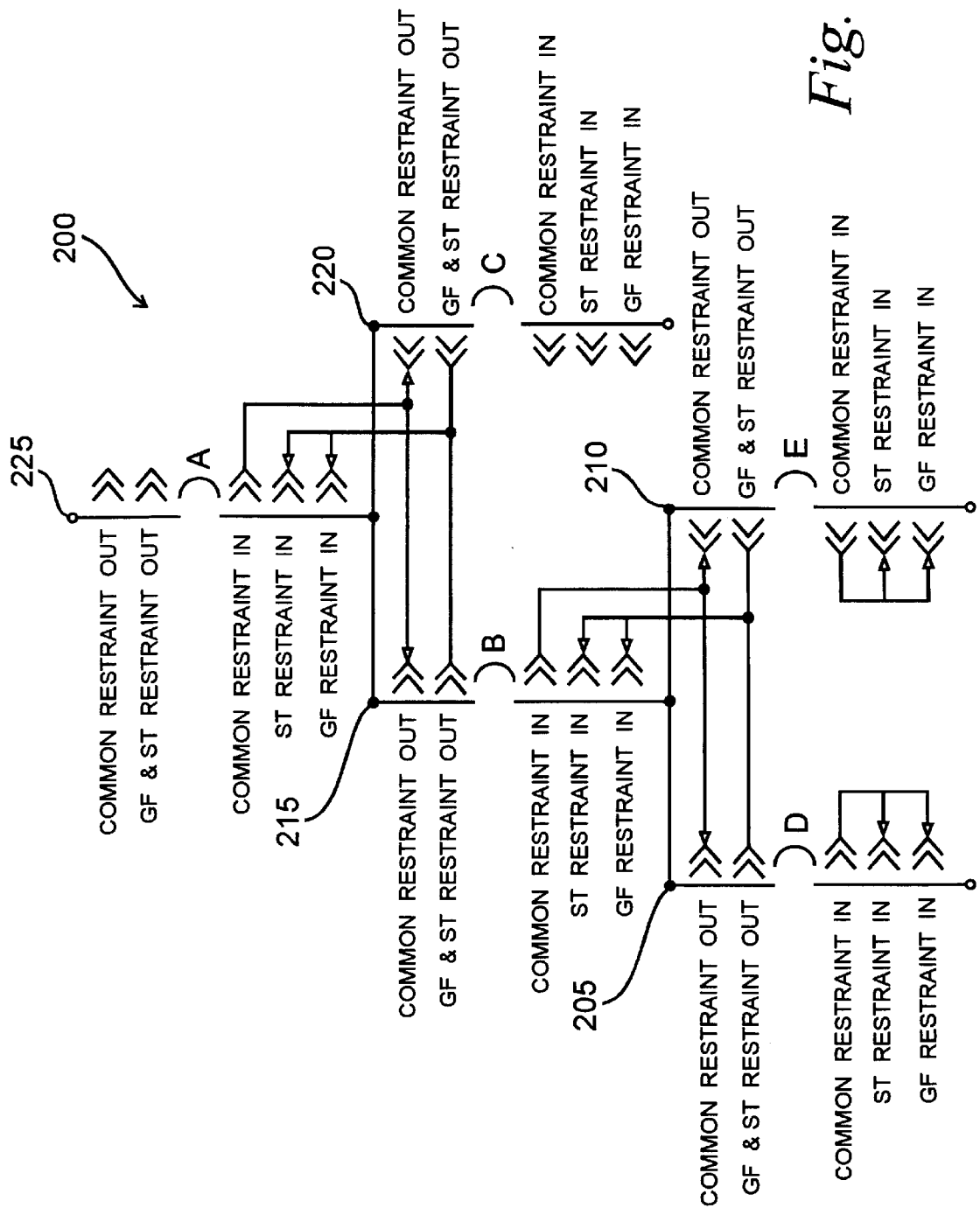
FIG. 2 is a schematic illustrating a zone selective interlocking system for electronic trip circuit breakers according to the present invention.

Referring now to FIG. 2, a zone selective interlocking system 200 according to the present invention is illustrated. The arrows indicate the direction of current flow. A plurality of downstream terminals, of which two terminals 205 and 210 are illustrated, are each connected to at least one of a plurality of downstream electronic trip circuit breakers, circuit breaker D and circuit breaker E, respectively. Each downstream electronic trip circuit breaker, circuit breakers D and E, respectively, includes input terminals for receiving a restraint signal, shown as a short time restraint input (ST RESTRAINT IN), a ground fault restraint input (GF RESTRAINT IN), and a common input (COMMON RESTRAINT IN). The downstream branch circuit breakers, circuit breakers D and E, include a restraint input circuit module connected to the input terminals and is described in greater detail in FIG. 3. A short circuit or short time (ST) condition occurs when there is a fault between a line and neutral or control when the level of current exceeds the rated capacity in a range of two to ten times the circuit breaker capacity. A ground fault (GF) condition occurs when current flows from the line to ground.

Each downstream electronic trip circuit breaker, circuit breakers D and E, respectively, also includes output terminals for sending a restraint signal, shown as a short time and ground fault restraint output (ST & GF RESTRAINT OUT) and a common output (COMMON RESTRAINT OUT). The downstream branch circuit breakers, circuit breakers D and E, include an output circuit module connected to the output terminals for providing galvanic isolation between circuit breakers and is described in greater detail in FIG. 4. The system 200 allows the downstream breaker closest to the fault to trip in a sufficient time interval before any of the upstream breakers.

A plurality of upstream terminals, of which two terminals 215 and 220 are illustrated, are each connected with at least one of a plurality of upstream electronic trip circuit breakers, circuit breaker B and circuit breaker C, respectively, for receiving a signal indicative of a downstream fault condition. Each upstream electronic trip circuit breaker, circuit breakers B and C, respectively, have input terminals for receiving a restraint signal, shown as short time restraint input (ST RESTRAINT IN), ground fault restraint input (GF RESTRAINT IN), and common input (COMMON RESTRAINT IN). The upstream branch circuit breakers, circuit breakers B and C, also include the restraint input circuit module connected to the input terminals. Each upstream electronic trip circuit breaker, circuit breakers B and C, respectively, also have output terminals for sending a restraint signal, shown as a short time and ground fault restraint output (ST & GF RESTRAINT OUT) and a common output (COMMON RESTRAINT OUT), and includes the output circuit module connected to the output terminals for providing galvanic isolation between circuit breakers.

A main terminal 225 is connected with a main electronic trip circuit breaker A for receiving a signal indicative of a fault condition downstream from the main circuit breaker A. The main circuit breaker A includes input terminals for receiving a restraint signal, shown as short time restraint input (ST RESTRAINT IN), ground fault restraint input (GF RESTRAINT IN), and common input (COMMON RESTRAINT IN) and includes the restraint input circuit module connected to the input terminals. The main circuit breaker A also includes output terminals for sending a restraint signal, shown as a short time and ground fault restraint output (ST & GF RESTRAINT OUT) and a common output (COMMON RESTRAINT OUT), and includes the output circuit module connected to the output terminals for providing galvanic isolation between circuit breakers.

Figure 3:
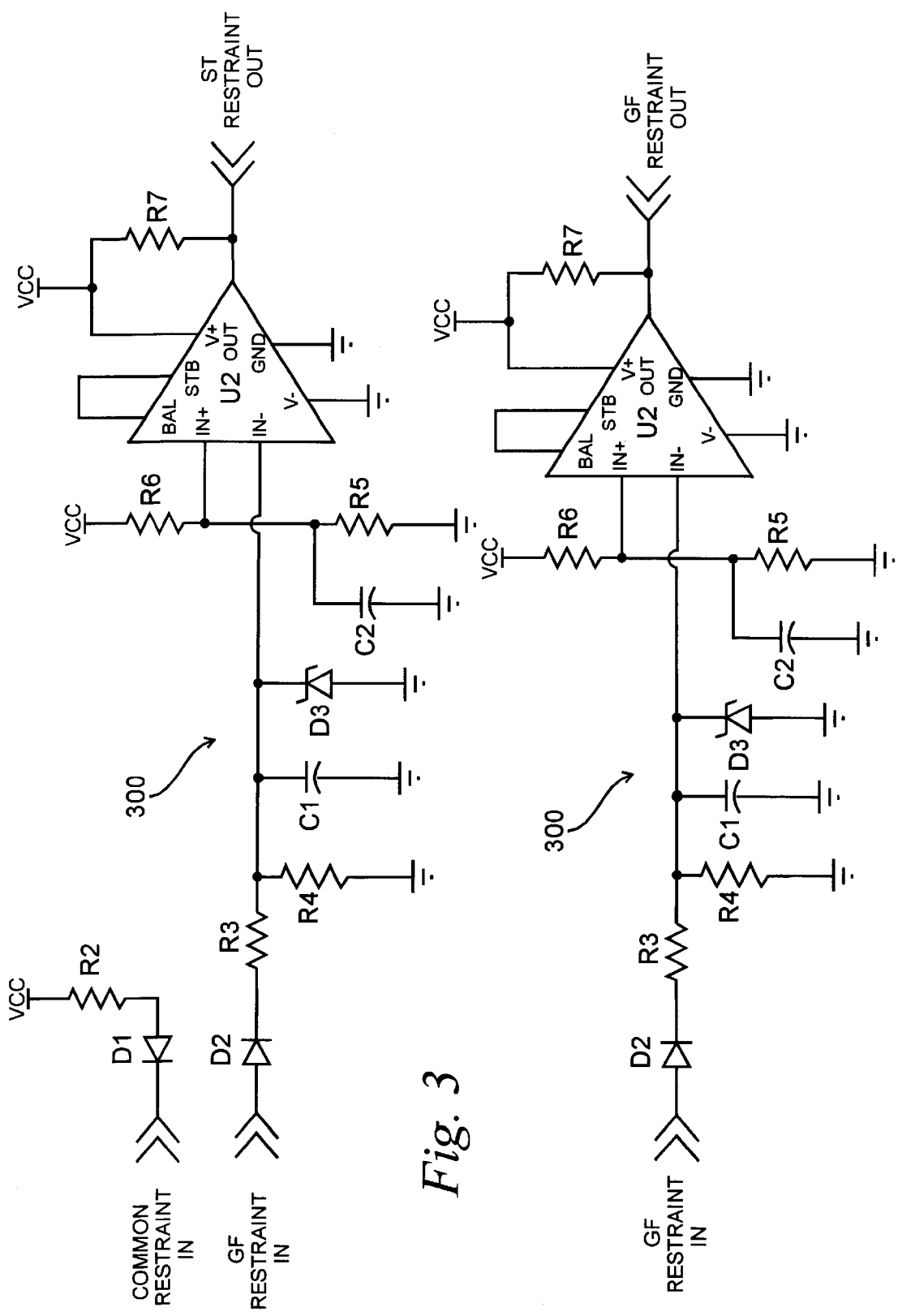
FIG. 3 is a schematic illustrating a restraint input circuit module according to the present invention.

The downstream electronic trip circuit breakers are connected so as to send a restraint signal to the corresponding upstream circuit breaker in the event of a fault occurring at the connected downstream terminal. The upstream electronic trip circuit breakers B and C, respectively, are also connected so as to send a restraint signal to the corresponding main circuit breaker A in the event of a fault condition downstream from the main circuit breaker A. For example, the downstream electronic circuit breaker D is shown connected to upstream circuit breaker B. If a fault occurs on a downstream circuit breaker, for example, circuit breaker D, current flows from circuit breaker B at the COMMON RESTRAINT IN terminal through the downstream circuit breaker D output circuitry and back into the ST RESTRAINT IN and GF RESTRAINT IN circuitry of circuit breaker B. The zone selective interlocking system 200 of the present invention including the restraint input circuit module provide a self-sourcing system design wherein the downstream circuit breaker D acts only as a switch to complete the circuit and provide a restraint signal to the upstream circuit breaker B in the event of a downstream fault condition. FIG. 3 illustrates a self-sourcing restraint input module which provides the necessary energy to the restraining device circuitry to ensure the electronic trip circuit breaker is placed into a restrained mode.

Referring to FIG. 3, the restraint input circuit module 300 connected to the input terminals of each of the electronic trip circuit breakers is illustrated. A voltage is acted upon by the electronic trip circuit breaker through the associated restraint input circuit module 300. The restraint input circuit module 300 and the output circuit module 400 (see FIG. 4) of the present invention is incorporated into an electronic trip unit of the electronic trip circuit breakers. The electronic trip unit has two modes of operation, restrained and unrestrained. In the unrestrained mode, the electronic trip unit initiates a trip of the corresponding circuit breaker instantaneously regardless of selected delay settings. In the restrained mode, the electronic trip unit initiates a trip of the circuit breaker after the selected delay has timed out. Incorporating the restraint input circuit module 300 and the output circuit module 400 into the zone selective interlock system 200 of the present invention allows the circuit breakers to communicate with each other ensuring that the breaker closest to the fault clears the fault without the need for additional drive capacity and while also providing galvanic isolation between the circuit breakers on the same level and the level above.

The restraint input circuit module 300 of the present invention includes a voltage comparator U2, such as, for example, an operational amplifier, and a resistor network, which operates in the following manner. The COMMON RESTRAINT IN terminal input of the circuit breakers, a common reference input signal, is connected to a voltage source VCC through diode D1 and resistor R2. The ST RESTRAINT IN terminal input and the GF RESTRAINT IN terminal input of the circuit breakers is each connected to an identical restraint input circuit module 300. The resistor network of the restraint input circuit module 300 includes a blocking diode D2 and buffer resistor R3. The resistor network also includes resistor R4, capacitor C1 and zener diode D3 connected to ground and limiting the voltage input to the inverting input (IN–) of the voltage comparator U2. The voltage at the noninverting input (IN+) of the voltage comparator U2 is set by the voltage dividing resistors R5 and R6 and capacitor C2. Pull up resistor R7 limits the current flow from VCC to ground when the output of voltage comparator U2 is low (0V).

When the voltage drop between the COMMON RESTRAINT IN terminal and the RESTRAINT IN terminal (either the ST RESTRAINT IN terminal or the GF RESTRAINT IN terminal) is greater than approximately ten volts (10V), indicating an open circuit connection, the voltage at the inverting input (IN–) of voltage comparator U2 is less than the voltage at the noninverting input (IN+). The voltage at the non-inverting input is set by the voltage divider R5 and R6. When the inverting input (IN–) of the voltage comparator U2 is negative with respect to the noninverting input (IN+) of the voltage comparator U2, the output of the voltage comparator U2 is pulled high wherein the associated electronic trip circuit breaker is signaled to operate in the unrestrained mode (instantaneous tripping) in the event of a fault.

Figure 1:
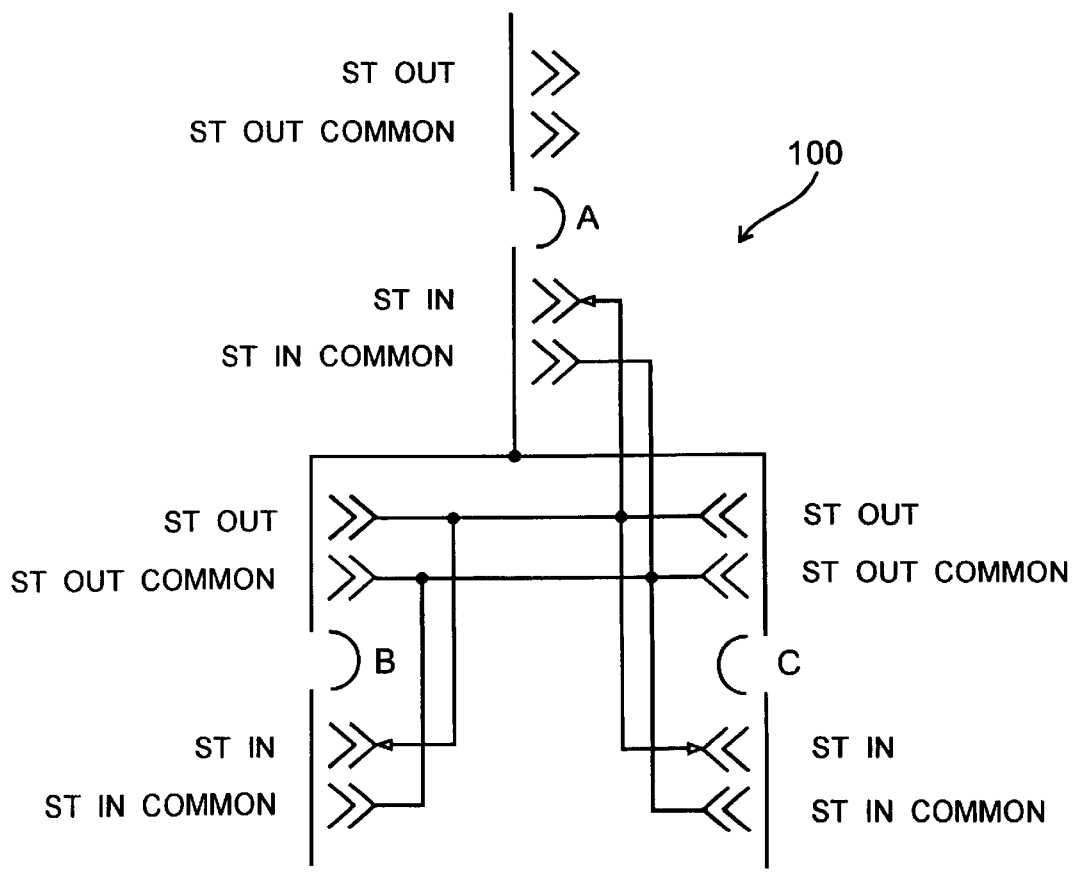
FIG. 1 (labeled prior art) is a schematic illustrating a prior art zone selective interlocking system for electronic trip circuit breakers.

When the voltage drop between the COMMON RESTRAINT IN terminal and the RESTRAINT IN terminal (either the ST RESTRAINT IN terminal or the GF RESTRAINT IN terminal) is less than approximately three volts (3V), indicating a short circuit connection, the voltage at the inverting input (IN–) of voltage comparator U2 exceeds the voltage at the noninverting input (IN+) and the output of the voltage comparator U2 goes low (0V). This signals the associated electronic trip circuit breaker to operate in the restrained mode (a timed delay tripping) in the event of a fault. By using a short between the COMMON RESTRAINT IN terminal and the RESTRAINT IN terminal (either the ST RESTRAINT IN terminal or the GF RESTRAINT IN terminal), for example, simply placing a jumper wire between the COMMON RESTRAINT IN terminal and the RESTRAINT IN terminal, the associated circuit breaker is self-restrained. As shown in FIG. 2, the input terminals (the COMMON RESTRAINT IN terminal, the ST RESTRAINT IN terminal and the GF RESTRAINT IN terminal) of each downstream electronic trip circuit breaker, circuit breakers D and E, respectively, are shorted together to provide a self-restraint signal. Therefore, a restraint output circuit is not needed to self-restrain the electronic trip unit of the circuit breakers. When using the self-restraint circuitry of the present invention, the output circuit is not required to drive current into the input circuitry to self-restrain. The advantage of having an electronic trip circuit breaker continuously self-retrained, as shown in FIG. 2, is that the circuit breaker is self-restrained at power up unlike the prior art system, shown in FIG. 1, where the downstream circuit breaker must recognize the fault and output a signal before the downstream circuit breaker is placed in the retrained mode.

Figure 4:
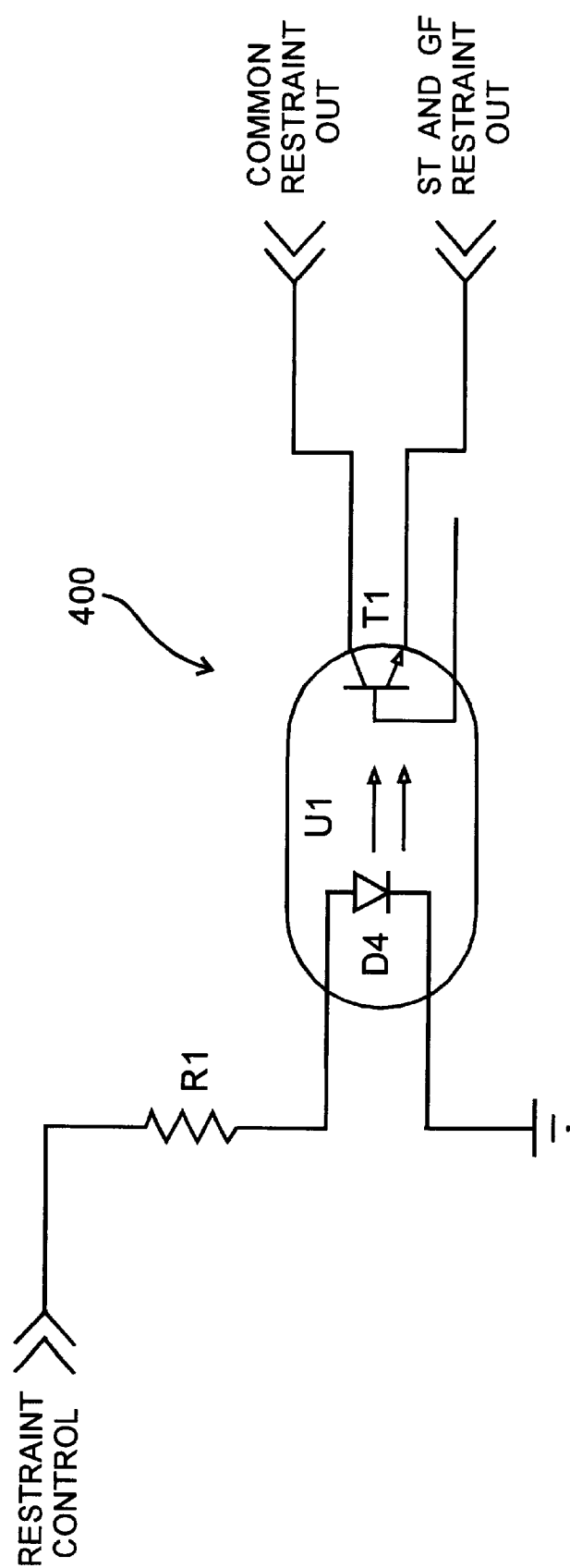
FIG. 4 is a schematic illustrating an output circuit module according to the present invention.

FIG. 4 illustrates the output circuit module 400 according to the present invention wherein the output circuit module includes an opto-isolator U1. The opto-isolator U1 allows signals to be sent between circuits with separate grounds. The opto-isolator U1 consists of light emitting diode D4 and transistor T1. The base of transistor T1 is optically biased by diode D4. A restraint control line is connected to the light emitting diode D4 through buffer resistor R1. The collector of transistor T1 is the common output terminal, shown as COMMON RESTRAINT OUT, and the emitter of the transistor T1 is connected to the restraint output terminal shown as the ST AND GF RESTRAINT OUT.

When the restraint control line, shown as RESTRAINT CONTROL, from the electronic trip unit of the associated circuit breaker is low, the opto-isolator U1 is not conducting, and the output signal, ST AND GF RESTRAINT OUT, is open signaling the unrestrained mode (instantaneous tripping) to the electronic trip unit. When the restraint control line, shown as RESTRAINT CONTROL, is pulled high, the light emitting diode D4 of the opto-isolator U1 conducts causing the transistor T1 to conduct wherein the output terminals, ST AND GF RESTRAINT OUT and COMMON RESTRAINT OUT, are shorted together signaling the restrained mode (timed delay tripping) to the electronic trip unit. Therefore, the output circuit module 400 provides electrical/galvanic isolation between circuit breakers in the restrained mode and circuit breakers in the unrestrained mode.

Figure 5:
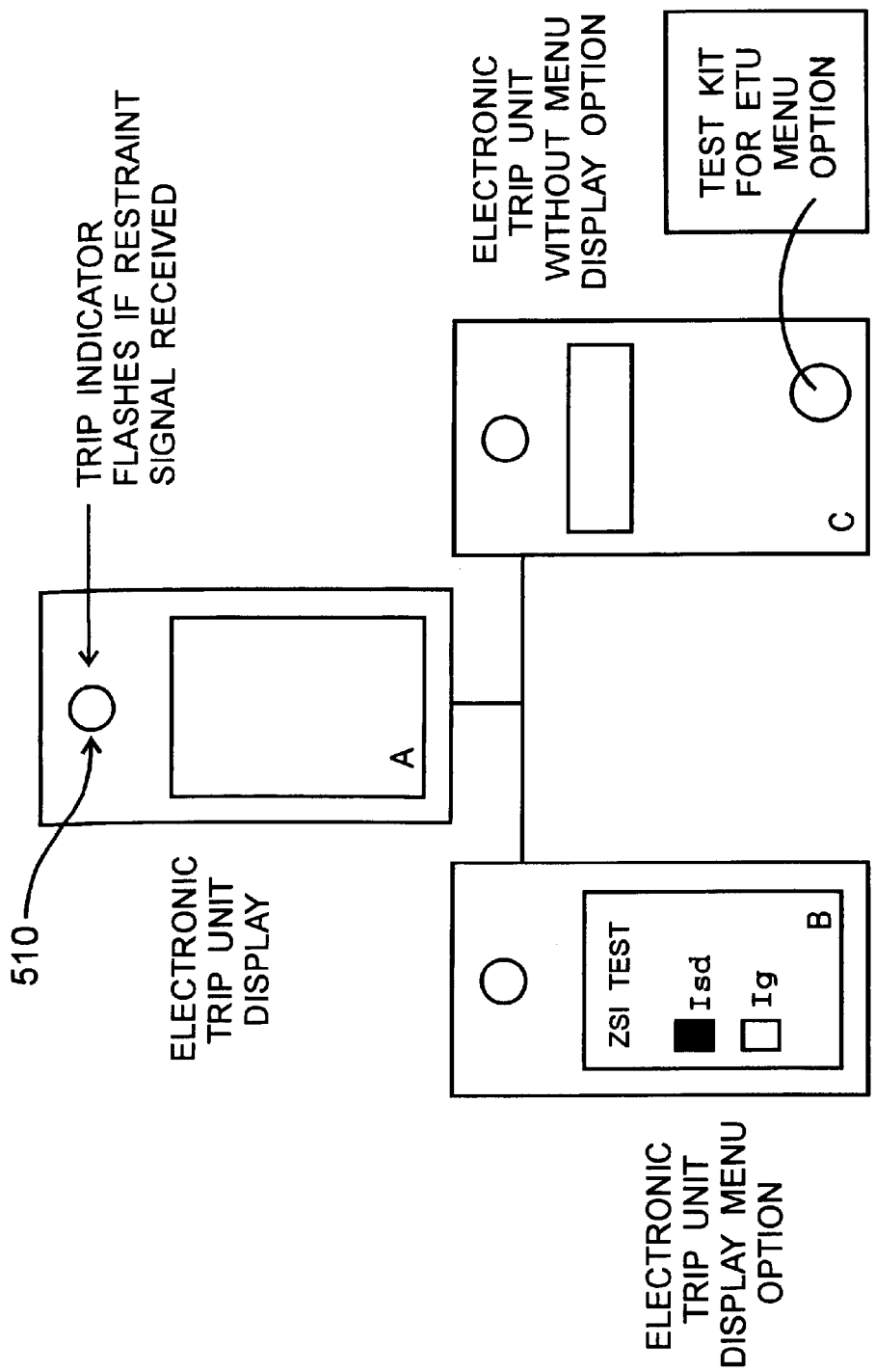
FIG. 5 illustrates a display test unit for testing the zone selective interlocking system of the present invention.

FIG. 5 illustrates three circuit breakers, an upstream circuit breaker A and downstream circuit breakers B and C including a display test unit. Downstream circuit breakers B and C send a restraint signal to upstream circuit breaker A. Circuit breaker B has an electronic trip unit fitted with the display test unit and allows a user to select a test option from a menu to send a restrain signal. Circuit breaker C has an electronic trip unit without a display test unit, however, the user can use a separate display test kit which communicates with the electronic trip unit. A laptop personal computer (not shown) is used at the user interface with the display test unit. The test kit for the electronic trip unit is a device that allows the user to test the functionality of the electronic trip unit by secondarily injecting fault signals into the electronic trip unit through a test plug. This test kit also includes communication capabilities with the microprocessor inside the electronic trip unit. The upstream circuit breaker A flashes the trip indicator light emitting diode 510 to verify that the restraint signal has been received. The display test unit will also provide power to the electronic trip unit so that, when the system is de-energized, such as during a new installation, the electronic trip unit can be powered up to send a restraint signal or to verify the restraint signal has been received. This allows complete verification of system wiring by just initiating a send restraint command in the menu and verifying that the correct light emitting diode indicator flashes. One individual can verify a complete new installation using two display test units, one display test unit to send the restraint signal and a second display test unit to verify the upstream breakers receive the restraint signal.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. A zone selective interlocking system for electronic trip circuit breakers comprising:

a plurality of downstream terminals, each downstream terminal connecting with at least one of a plurality of downstream electronic trip circuit breakers having input terminals;

a restraint input circuit module connected to the input terminals of each of the downstream electronic trip circuit breakers wherein the input terminals are shorted together for providing a self-restraint signal for each downstream electronic trip circuit breaker at the occurrence of a downstream fault condition;

a plurality of upstream terminals, each upstream terminal connecting with at least one of a plurality of upstream electronic trip circuit breakers having input terminals; and a restraint input circuit module connected to the input terminals of each of the upstream electronic trip circuit breakers for receiving a signal indicative of the downstream fault condition and wherein the restraint input circuit module is self-sourcing thereby providing sufficient energy to place each of the upstream electronic trip circuit breakers in a restrained mode.

2. A system, as recited in claim 1, wherein the restraint input circuit module includes a voltage comparator.

3. A system, as recited in claim 1, further comprising:

an output circuit module connected to each of said upstream electronic trip circuit breakers and each of said downstream electronic trip circuit breakers for providing galvanic isolation between circuit breakers in a restrained mode and circuit breakers in an unrestrained mode.

4. A system, as recited in claim 3, wherein the output circuit module includes an opto-isolator.

5. A system, as recited in claim 1, further comprising:

a display test unit connected to two or more of the electronic trip circuit breakers for verifying correct operation of the zone selective interlocking system by sending a test restraint signal from the downstream electronic trip circuit breakers and verifying receipt of the test restraint signal by the upstream electronic trip circuit breakers.

6. A zone selective interlocking system for electronic trip circuit breakers comprising:

a plurality of downstream terminals, each downstream terminal connecting with at least one of a plurality of downstream electronic trip circuit breakers having input terminals;

a restraint input circuit module connected to the input terminals of each of the downstream electronic trip circuit breakers wherein the input terminals are shorted together for providing a self-restraint signal for each downstream electronic trip circuit breaker at the occurrence of a downstream fault condition;

a plurality of upstream terminals, each upstream terminal connecting with at least one of a plurality of upstream electronic trip circuit breakers having input terminals;

a restraint input circuit module connected to the input terminals of each of the upstream electronic trip circuit breakers for receiving a signal indicative of the downstream fault condition and wherein the restraint input circuit module is self-sourcing thereby providing sufficient energy to place each of the upstream electronic trip circuit breakers in a restrained mode; and an output circuit module connected to each of said upstream electronic trip circuit breakers and each of said downstream electronic trip circuit breakers for providing galvanic isolation between circuit breakers in a restrained mode and circuit breakers in an unrestrained mode.

7. A system, as recited in claim 6, wherein the restraint input circuit module includes a voltage comparator.

8. A system, as recited in claim 6, wherein the output circuit module includes an opto-isolator.

9. A system, as recited in claim 6, further comprising:

a display test unit connected to two or more of the electronic trip circuit breakers for verifying correct operation of the zone selective interlocking system by sending a test restraint signal from the downstream electronic trip circuit breakers and verifying receipt of the test restraint signal by the upstream electronic trip circuit breakers.

* * * * *